United States Patent [19]

Workman

[11] Patent Number: 4,906,809
[45] Date of Patent: Mar. 6, 1990

[54] METAL SLITTING AND STAMPING

[76] Inventor: John Workman, Lough House,, Greyabbey, County Down, Northern Ireland

[21] Appl. No.: 66,372

[22] Filed: Jun. 25, 1987

[51] Int. Cl.[4] .............................................. B23K 9/00
[52] U.S. Cl. ........................... 219/121.39; 219/121.54; 219/121.36; 72/342; 72/364; 72/202
[58] Field of Search .................. 219/121 PC, 121 PY, 219/121 P, 121 PD, 121.65, 121.66, 121.54; 72/364, 342, 200, 202

[56] References Cited

U.S. PATENT DOCUMENTS

| | | | |
|---|---|---|---|
| 3,060,881 | 10/1962 | Gahlinger | 72/364 |
| 3,344,648 | 10/1967 | Gray | 72/364 |
| 3,893,318 | 7/1975 | King, Jr. et al. | 72/363 |
| 3,974,673 | 8/1976 | Rosness et al. | 72/364 |
| 4,204,111 | 5/1980 | Yonko | 219/350 |
| 4,584,860 | 4/1986 | Leonard | 72/364 |

Primary Examiner—M. H. Paschall
Attorney, Agent, or Firm—Neuman, Williams, Anderson & Olson

[57] ABSTRACT

The invention makes use of the controlled, differential application of heat to effect dimensional control in the slitting or stamping of metal workpieces. In a principal embodiment (FIG. 1), a metal strip (40) supplied from a reel (2) is slit into narrower strips by a slitting mechanism (12, 13) and the slit strips (41) are reeled up separately (at 23). A controllable heating apparatus (8, 9) is provided before the slitting mechanism (12, 13) and is arranged to effect heating of the strip (40) in a controlled manner which varies across the width of the strip (40) to compensate for variable tension in the strip across its width. Other applications of controlled, variable heating are also described.

13 Claims, 18 Drawing Sheets

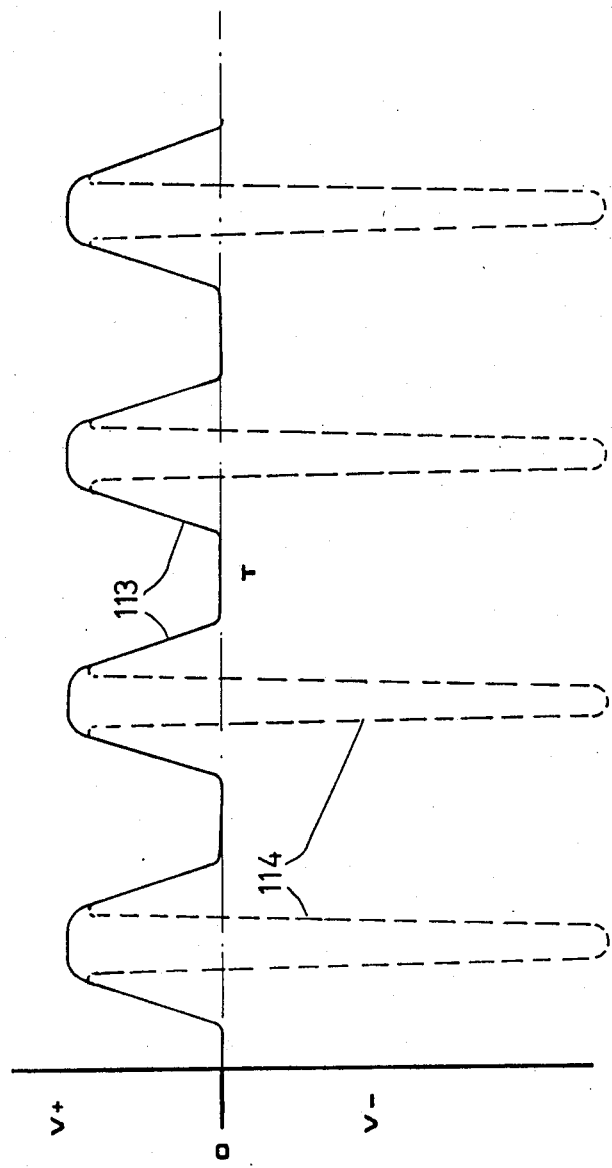

METAL SLITTING AND STAMPING

BACKGROUND OF THE INVENTION

This invention relates to improved methods and apparatus for slitting and stamping metal strip, with particular reference to scroll-slitting a broad strip into narrower strips with profiled edges, followed by stamping in a high speed progression tooling press.

It is known to scroll-slit metal strip in broad coil form into a number of narrow strips on which the eventual components are, in effect, nested with those on adjacent strips in order to save material in producing parts with shapes such as circles or triangles; see for example U.S. Pat. No. 1,433,138 (P. Kreuse). A major difficulty with such machinery is obtaining very accurate feature spacing or wavelength, which is required if the resulting strips are to be fed to fixed feed length progression tools such as are used in the manufacture of electric motor laminations. This difficulty is addressed in my International patent application PCT/GB85/00347, which deals with the case of profiled edge cutters and steerable shearing rollers in particular.

It is also known to cut and slit sheet metal coil by radiation and energy beams such as laser and plasma. The positions of the beams may be controlled to close tolerances with respect to a relatively moving metal strip and reciprocated transversely to produce the required repetitive features.

My application PCT/GB85/00347 also addresses the problem of varying parameters of the input coil, such as temperature and tension, which may affect the resulting wave length.

A difficulty associated with the scroll-slitting process is that inherent stresses in a metal band are not necessarily uniform across the width and thus the slit strips may not all have the same feature spacing, due to varying amounts of stress relief which may be released during, or shortly after, the slitting process.

SUMMARY OF INVENTION

An object of the present invention is to remove or ameliorate these difficulties. The diameter control of the wheel profile cutting means can be effected differentially across the strip width, or conversely the strip temperature may be controlled by the input of heat just prior to cutting, in different amounts across the width dimension of the broad coil. This differential may be preselected, but preferably is controlled automatically through a servo by feedback from a measurement of the exiting strips after they have been cooled to a given temperature, or by a measuring means which also compensates for differing temperatures and/or other length-influencing parameters.

It is clear that the creation of temperature differences in the metal band immediately prior to slitting will also influence the width of the slit strips measured at some given temperature such as ambient. This could be counteracted by individual transverse positional control of the cutting means by numerical methods, but at high cost. The present invention accordingly provides means for controlling these widths in slitting machinery by adjusting the transverse position of the cuts incrementally by means which are extremely stiff and accurate. Although principally of relevance to scroll-slitting, this could equally be applied to straight slitting.

It is well known to separate the strands in a slitting process by looping in a pit below, or accumulator above, the pass line. This permits equal tension winding of the strips which, due to individual thickness variations, build up to differing diameters during a run. Thin metals such as used in electric motor laminations result in a high number of turns and considerable length variations result, thus leading to costly deep looping pits. Additionally, strand separation in scroll-slitting needs to be substantially greater than in straight slitting to avoid interference between adjacent profiled edges. The present invention provides a novel means of strand separation which substantially reduces the space requirement.

If slitting is carried out by energy beams, there is a tendency for small beads of re-solidified metal to form on the edges of the cut, which can damage tooling at subsequent processes if left in place. The invention provides a simple means of dealing with this problem.

Other aspects of the present invention relate to the progression tooling apparatus and stamping process. In these, the dimensional tolerances are very small. This is due to the need to avoid subsequent turning or grinding operations and to maintain high levels of product accuracy. In the production of electric motor laminations, for example, a high degree of accuracy and concentricity of the rotor location is required to achieve a minimum air gap in the assembled motor.

Difficulties are encountered in meeting these tolerances due to stress relief and working as the workpiece passes through the stages of the tooling. The amount of relief is variable and difficult to predict accurately. The degree of sharpness of the tool and the age of the tool in its working life, during which it may have been reground several times, affect the size of the features produced.

The use of scroll-slitting as a precursor for the production of circular parts alleviates this problem to some extent, since there is a degree of stress relief as the cut follows round more of the diameter, provided this effect is allowed for as previously indicated.

Some of the required correction can be conveniently produced by high accuracy input of thermal energy to specific areas of the strip closely before the stamping means, in order to affect the size, shape and inter-related positions of successively stamped features. Preferably, infrared heating is used, and control is exercised by programmed and/or automaticsensing means.

The invention provides means for effecting incremental movement of the tooling in a progressive press to maintain relative location and concentricity. There is also provided an improved type of locating pin for use in such presses.

BRIEF DESCRIPTION OF DRAWINGS

Embodiments of the invention will now be described, by way of example only, with reference to the drawings, in which:

FIG. 12C shows graphs of velocity against time for parts of FIG. 12B;

DESCRIPTION OF THE PREFERRED EMBODIMENT

Figure 1:
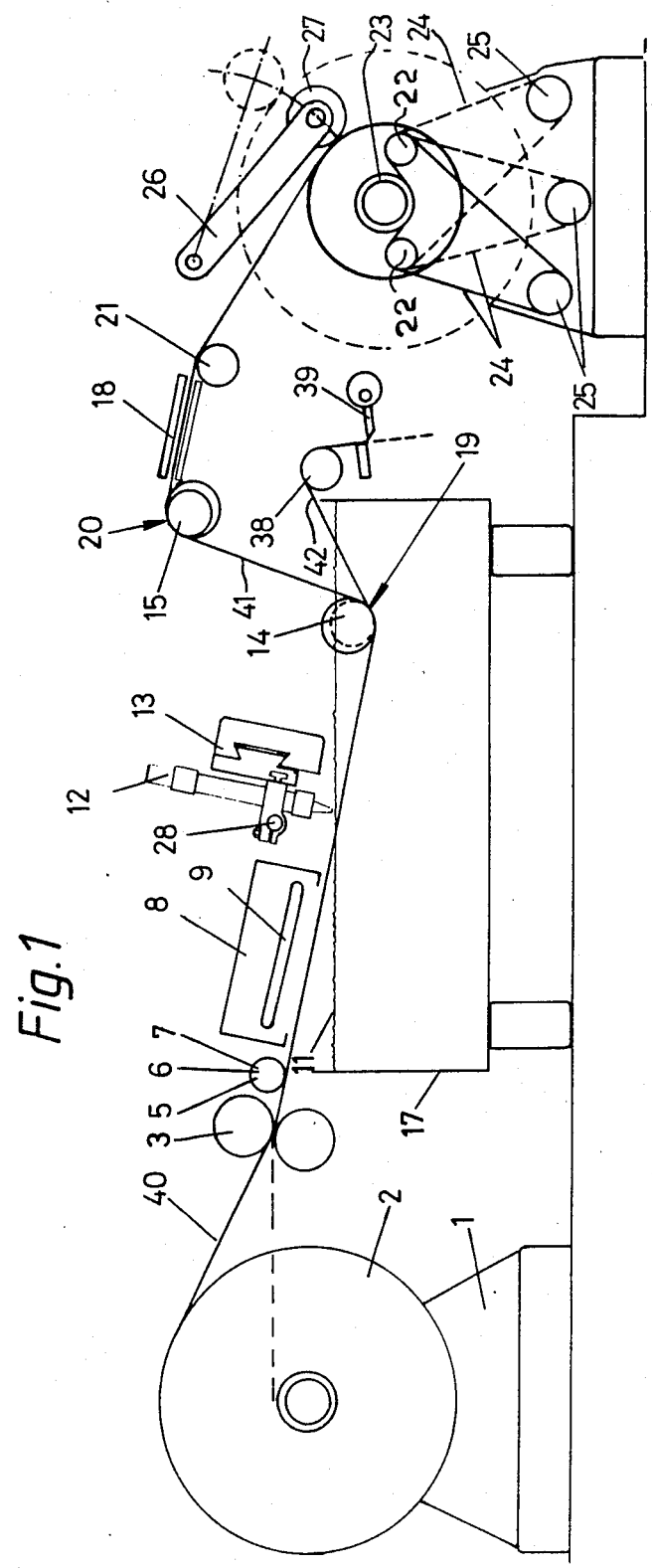
FIG. 1 is a diagrammatic side view of a scroll slitting apparatus embodying the invention.

Referring to FIG. 1, a reel stand 1 mounts a reel 2 of metal strip which is to be split into a number of narrower strips with profiled edges. The strip is drawn off the reel 2 at 40 by pinch rolls 3, straightening rolls, or the like, slit by cutting means 12, and the profiled slit strips re-reeled.

The cutting means 12, as will be described in detail, are transversely movable to obtain the desired profile. Before slitting, the strip 40 is acted on thermally to achieve a consistent profile wavelength. Such an arrangement is described in PCT/GB85/00347.

In the present invention, however, the thermal adjustment is also used differentially across the width of the strip 40 to deal with the above-noted problem of differential stress relief.

In the embodiment of FIG. 1, sensors indicated at 5,6,7 are provided for measuring respectively tension, temperature and velocity; such sensors can be of any suitable kind well known in the art and will not be further described. The thermal adjustment is then performed by a heating assembly 8, for example containing quartz halogen lamps 9 which have a suitably quick response.

Figure 2:
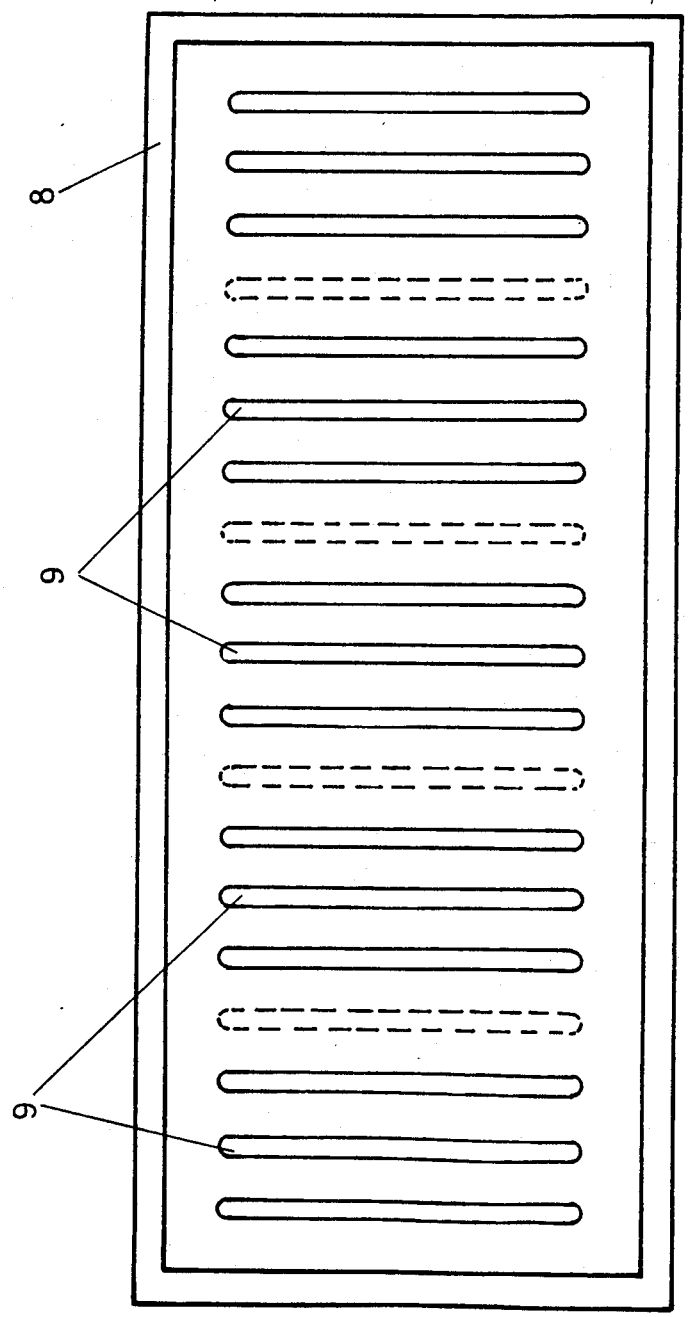
FIG. 2 illustrates in plan view a heating device used in the apparatus of FIG. 1.

FIG. 2 shows one form of heating assembly 8 with quartz halogen lamps 9 aligned with the direction of travel of the strip 40. Suitably, each individual lamp is driven by a respective power amplifier under the control of a central microprocessor. The lamps 9 can thus be controlled, as will be described in more detail hereinafter, to take account of a number of parameters. One parameter is the temperature of the incoming strip 40 which would affect the profile wavelength at the point of subsequent use of the strip; this parameter is essentially constant across the width of the strip and is compensated by heating which is substantially uniform across the strip. Another parameter is differential stress across the width of the strip, which is compensated by differential heating across the width of the strip.

Figure 3:
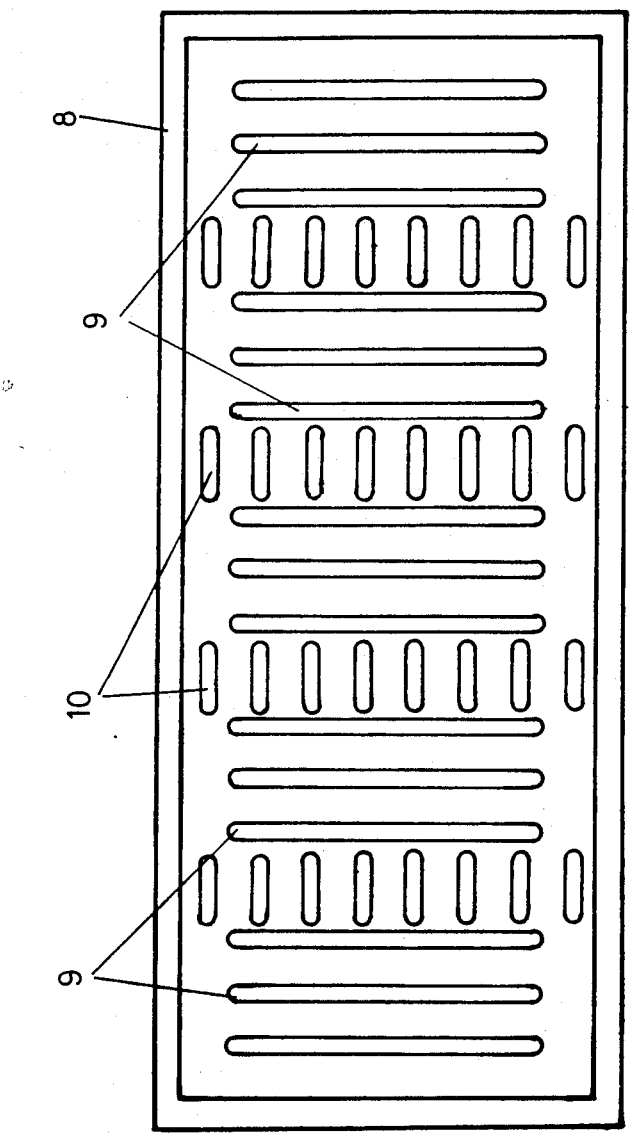
FIG. 3 is a view similar to FIG. 2 of an alternative form of heater.

FIG. 2 illustrates the heating of a strip being slit into five, the lamps 9 shown in dotted outline being aligned with the general area of the slitting. These four lamps would be maintained off. It may however be desired also to effect heating of the edge areas and, since these will be slit in a profiled manner with periodical lobes, it is necessary to have some means for heating the lobes to be formed on one strip differently from those to be formed on the neighbouring strip. FIG. 3 shows an arrangement for achieving this. Small quartz halogen lamps 10 are arranged in four rows along the strip axis. These lamps 10 may be sequentially pulsed so as to produce a travelling heating effect which follows a lobe area. A similar effect could be achieved by means of moving lenses or mirrors.

Returning to FIG. 1, after thermal dimensional adjustment, the strip 40 is slit. In the embodiment shown, this is carried out by torches 12 transversely movable on slideway 13. The torches 12 may be plasma or laser torches. A coolant bath 17 is provided to minimise distortion due to the heat of the cutting torches. It is preferred that the strip 40 enters the surface 11 of the coolant at a shallow angle, and passes under the surface 11 immediately before the torches in the case of plasma cutting or immediately after the torches in the case of laser cutting.

Figure 6:
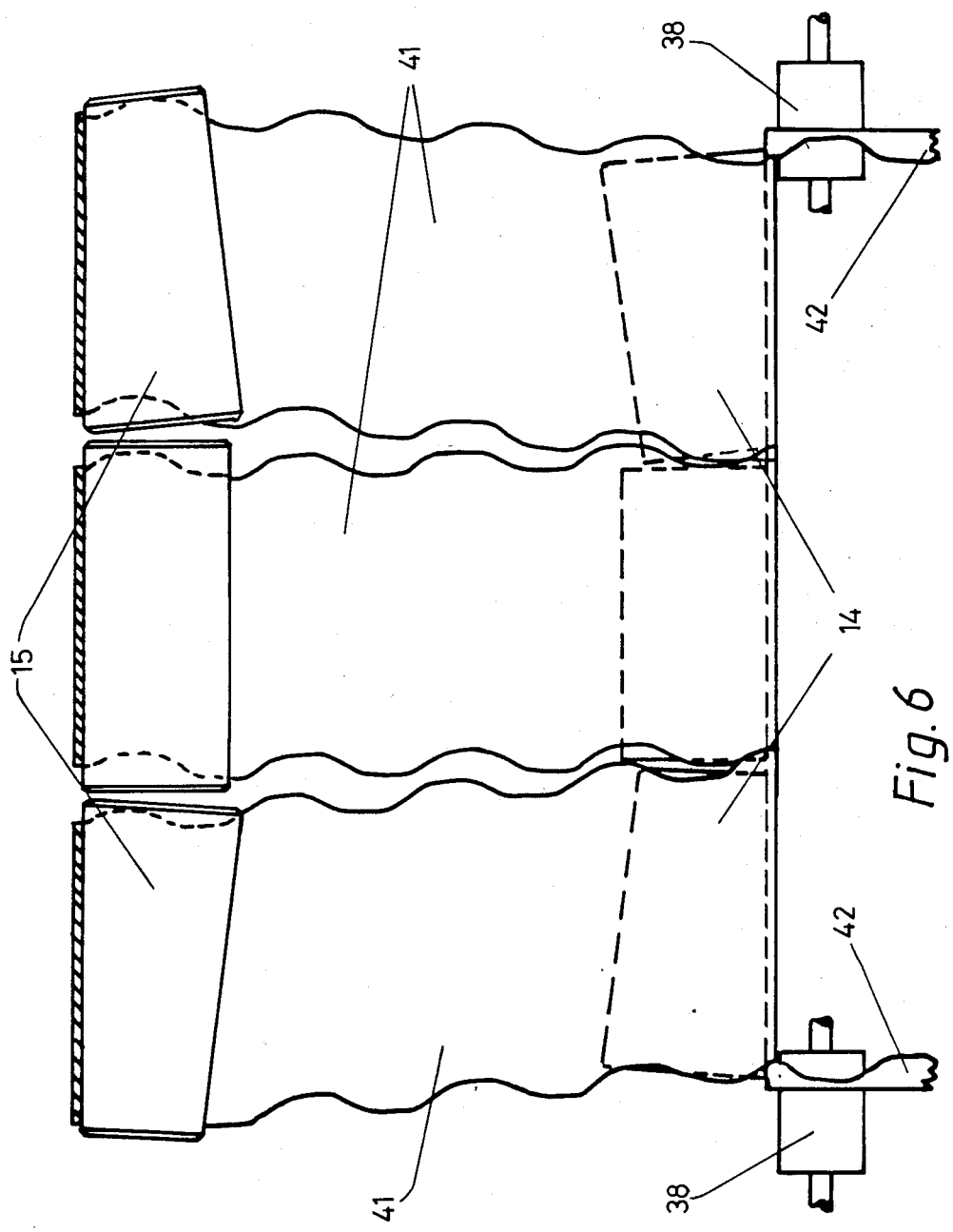
FIG. 6 is a plan view showing a strip separation arrangement in the apparatus of FIG. 1.

After cutting, the strips are separated by passing over paired rollers 14 and 15: see also FIG. 6. As shown, the outer roller pairs are part conical with equal and opposite conical angles. The effect of this is to provide a gap between neighbouring profiled slit strips 41 but with the strips ending parallel. This allows them to be reeled coaxially without interference between the profiled edges. The same effect could be achieved by use of roller pairs having different deflection angles or different lengths between the rollers of the several pairs. Conveniently, the first roller 14 of each pair may be positioned in the coolant tank 17 and the second roller 15 of each pair near the normal pass line level.

At this point the wavelength of the profiled strips 41 may be measured by means indicated at 18, such as a photodiode array, and this information fed to the central microprocessor as a further parameter for control of the differential heating means 8. The path length within the coolant bath 17 in conjunction with the speed of travel are chosen such that when the strips 41 reach the measuring means 18, the heat of cutting has been dissipated.

The apparatus of FIG. 1 also includes means for removing cutting burr, in the form of tungsten carbide knives 19, 20 which engage opposite sides of the strips at the rollers 14, 15 at a position where the strips are fully roll backed. The knives 19, 20 may additionally (not shown) be tilted and traversed in an oscillatory manner to follow the profiled strip edges.

Edge scrap from the strip 40 passes over and rolls 38 to a reciprocating scrap chopper 39.

The profiled slit strips 41 pass from the measuring means across a further roller 21, which equalizes the exit angles from the rolls 15 onto the changing diameter of the wind-up stand, to a set of rotatable hubs 22 on a wind-up mandrel 23. Each hub 22 has an associated drive collar keyed to it at one side, the drive collars being driven by individual coupling means such as belts 24 to a system of individual tension drives, preferably low voltage d.c. motors 25 with armatures connected in series, to provide equal torque at marginally differing spool up speeds. Increased torque may be provided by a driven roller follower arm 26 which has individual friction wheels 27 bearing on the wound strips. The arm 26 may also be used to measure build-up and act as a course tension control and provide a compensating signal for the changing reel diameter.

Another feature of the present invention is the provision of fine control of the width of the slitting means, the object being to obtain slit strip which, when returned to (or brought to) a standard temperature has a precise predetermined width dimension or dimension pattern.

Figure 4:
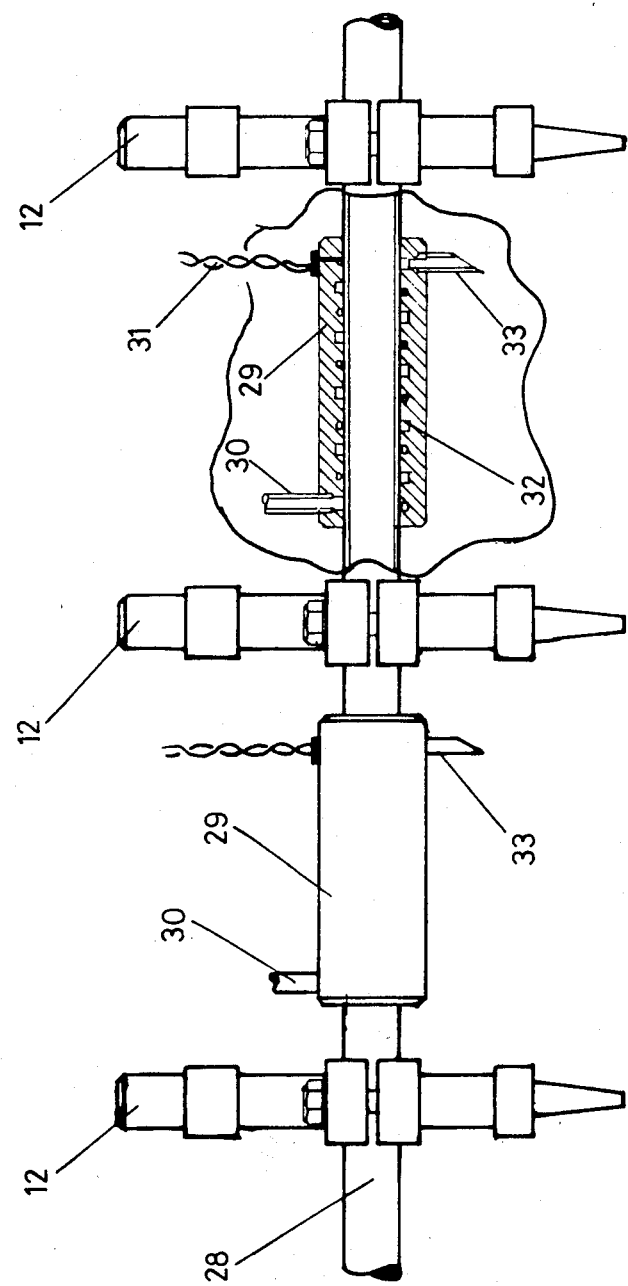
FIG. 4 is an end view of an adjustable cutter arrangement which may be used in the apparatus of FIG. 1.

FIG. 4 shows one embodiment for achieving such control in cutting with plasma torches 12. The torches 12 are clamped to a transverse member preferably in the form of a tube 28, being fastened at equal centres at ambient. The tube 28 is suitably a thin wall tube of aluminium, or other material of high thermal conductivity. A temperature sensing and adjusting means is provided intermediate each pair of torches 12, in the form of a collar 29 containing a spiral coolant channel 32 having a coolant supply 30 and drain 33. The collar 29 also has an embedded electrical heating element 31. Temperature sensing can be provided by measuring the resistance of the heating element 31, or by a thermistor or the like (not shown) in the collar 29.

In use, coolant is circulated continuously through the path 30, 32, 33 at a constant rate. The coolant may be air or, conveniently, water which may be from the main coolant tank 17. The temperature of the adjacent section of the tube 28 may then be controlled by varying the electrical input to the element 31. Suitably the cooling rate of the coolant is set at about one-half the maximum heating rate of the heating element 31.

A slitting machine of this nature is frequently re-set for width and number of cuts. It is therefore convenient to leave the collars 29 in fixed locations, and merely slide the torches 12 to new clamping positions and/or leave some of them inactive. The collars 29 are therefore of shorter length than the least intended width of strip. The ratios of heated length to torch spacing are input to the program controller and suitable temperature differences are computed and applied to the collars 29 to provide width compensation changes in the slit strip.

Figure 5:
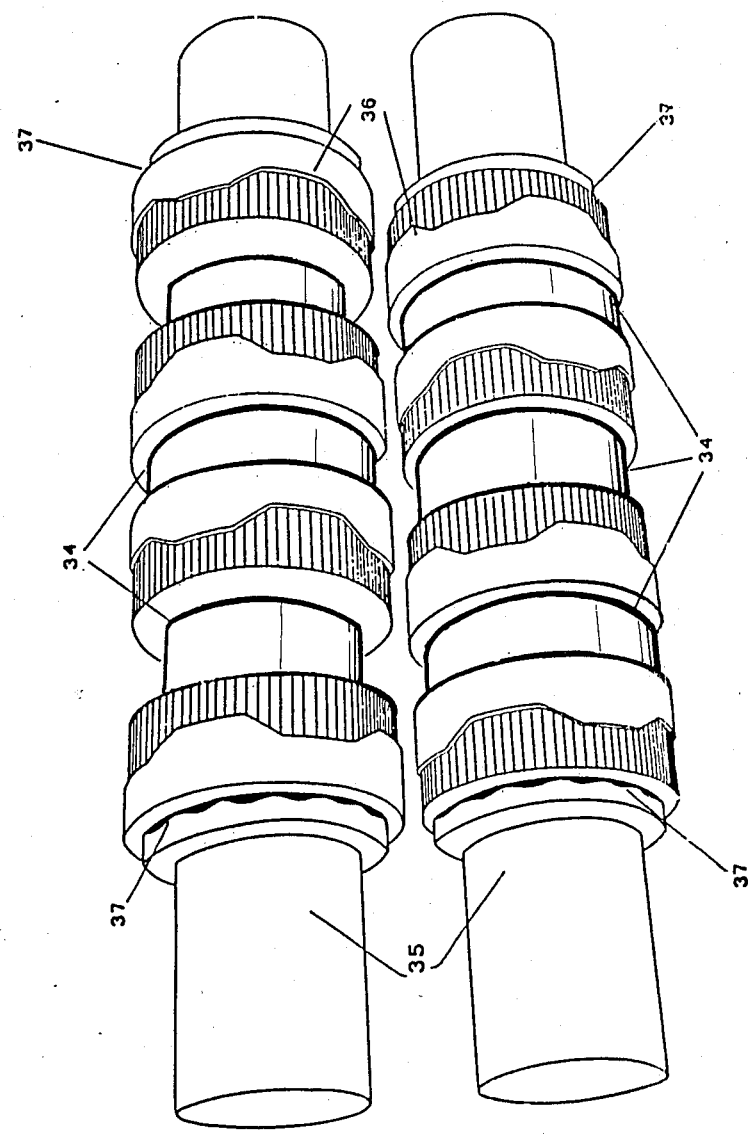
FIG. 5 is a perspective view of an alternative form of cutter arrangement.

Instead of using cutting torches, the strip may be slit by pairs of cutting wheels. FIG. 5 shows such an arrangement using profiled cutting wheels 36, mounted on rotatable mandrels 35. The cutting wheels 36 are separated by metal collars 34 having a thermal coefficient which is high in comparison with the metal being slit, e.g. if the metal being slit is steel the collars 34 may suitably be of aluminium. Compressible thrust washers 37 at each end exert a compressive pre-load on the assembly, so that the collars 34 are always working in compression. Each collar 34 is provided with heating means (not shown) for adjustment of the spacing between cutter wheels 36. Such heating means may be in the form of electric resistance elements, which could be combined with a constant coolant flow as in the above embodiment.

Slitting can also be achieved by steerable cutting rolls, as is described in PCT/GB85/00347. In that arrangement, the spacing between slitting positions can also be adjusted by thermal means between adjacent cutters, for example by means similar to those shown in FIG. 4, or by means similar to the "thermal microram" described below.

As discussed in PCT/GB85/00347, a primary object of achieving a very fine control of the dimensions of the profiled strip is to allow this to be fed continuously to progression tooling. In progression tooling, especially when working at high speed, extreme standards of accuracy are required to produce consistently acceptable products. This applies not only to length and width dimensions but also to concentricity and circularity. Another aspect of the present invention relates to fine adjustments in the progression tooling area itself to assist in achieving this.

It is conventional in progression tooling for the first stage to comprise the punching of pilot holes which act as locating means in subsequent stages, where the pilot holes are engaged by blunt-nosed pins. A problem, however, is that if the pins are a loose fit in the pilot holes a low accuracy of location results; if on the other hand a very close fit is sought the pin is likely to jam in the pilot hole or to distort the metal strip. This problem is also compounded by differential stress relief in the strip fed to the tooling.

Figure 7:
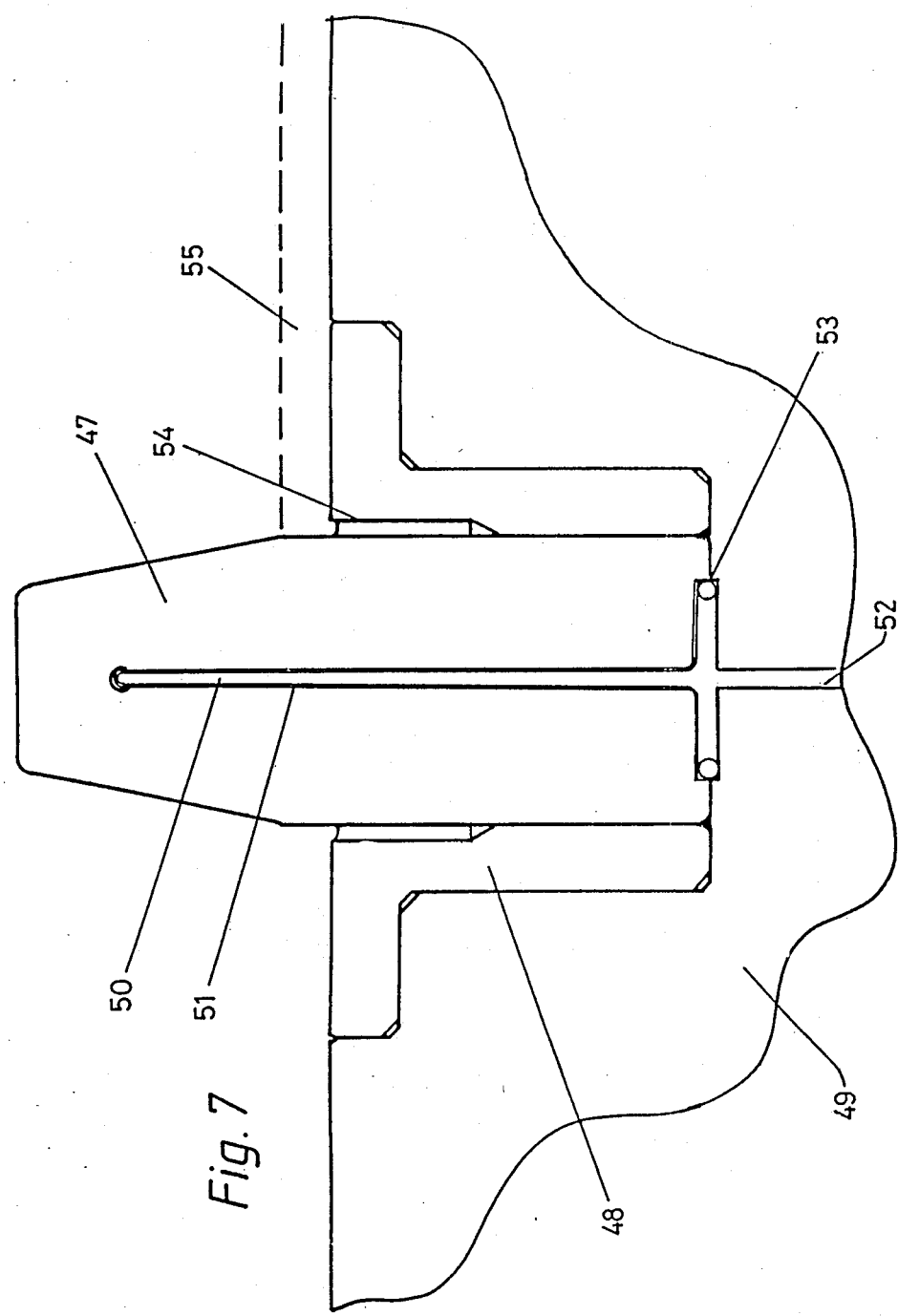
FIG. 7 is a cross-sectional side view of a locating pin in accordance with another apsect of the invention.

FIG. 7 shows one embodiment addressed to this problem. A pilot pin 47 set in a bush 48 in a tool section 49 has an axial slot 50 lined with a thin metal or elastomeric sleeve 51. This assembly can be expanded by hydraulic fluid entering at port 52 sealed by O-ring 53 to engage strip indicated at 55, and returned to size by a metal or elastomer spring collar 54.

Figure 8:
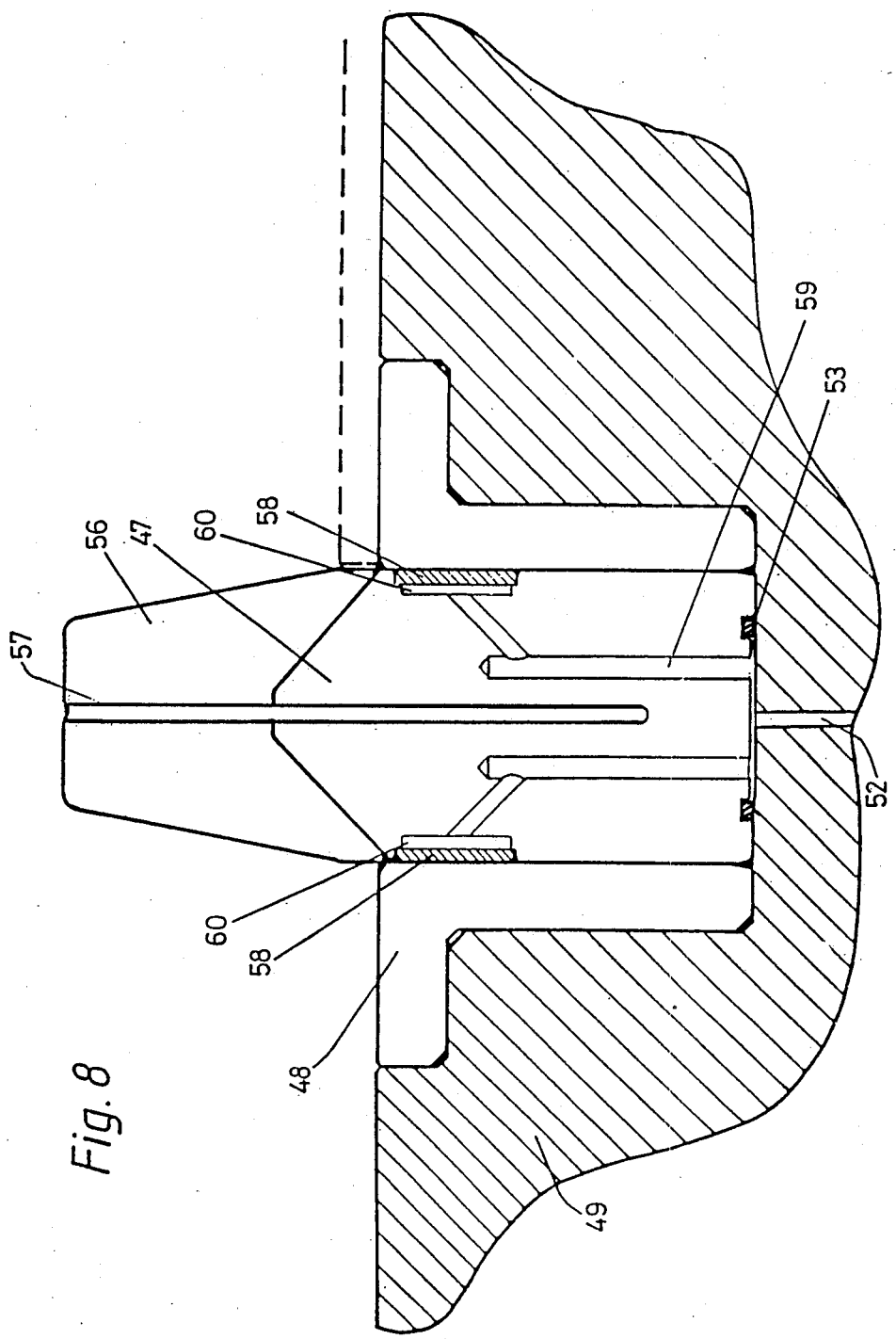
FIG. 8 is a view similar to FIG. 7 showing an alternative form of pin.

FIG. 8 illustrates a similar action achieved by a reverse operation. Pilot pin 47 in this example has a spring steel body with a carbide tip 56. A central metal or elastomer spring web 57 urges the pin open, and retraction is obtained by hydraulic pressure applied via port 52 and ports 59 to saddle-shaped fluid enclosures 60 closed by diaphragm 58.

The pins of both FIGS. 7 and 8 are driven by a hydraulic pump or pressure source timed from the crank angle of the main driving crank of the press tool so that the work is located to a very close tolerance immediately before and during the press stroke, but the pilot pins are shrunk during entry to and withdrawal from the pilot holes to avoid sticking or galling.

Typically, die and punch sections in large progression tooling die sets are clamped in a tool steel backing channel with smooth and highly accurate faces. Thus, these sections are positioned by hand before a production run, and there is no provision for controlled variation during production.

Figure 9:
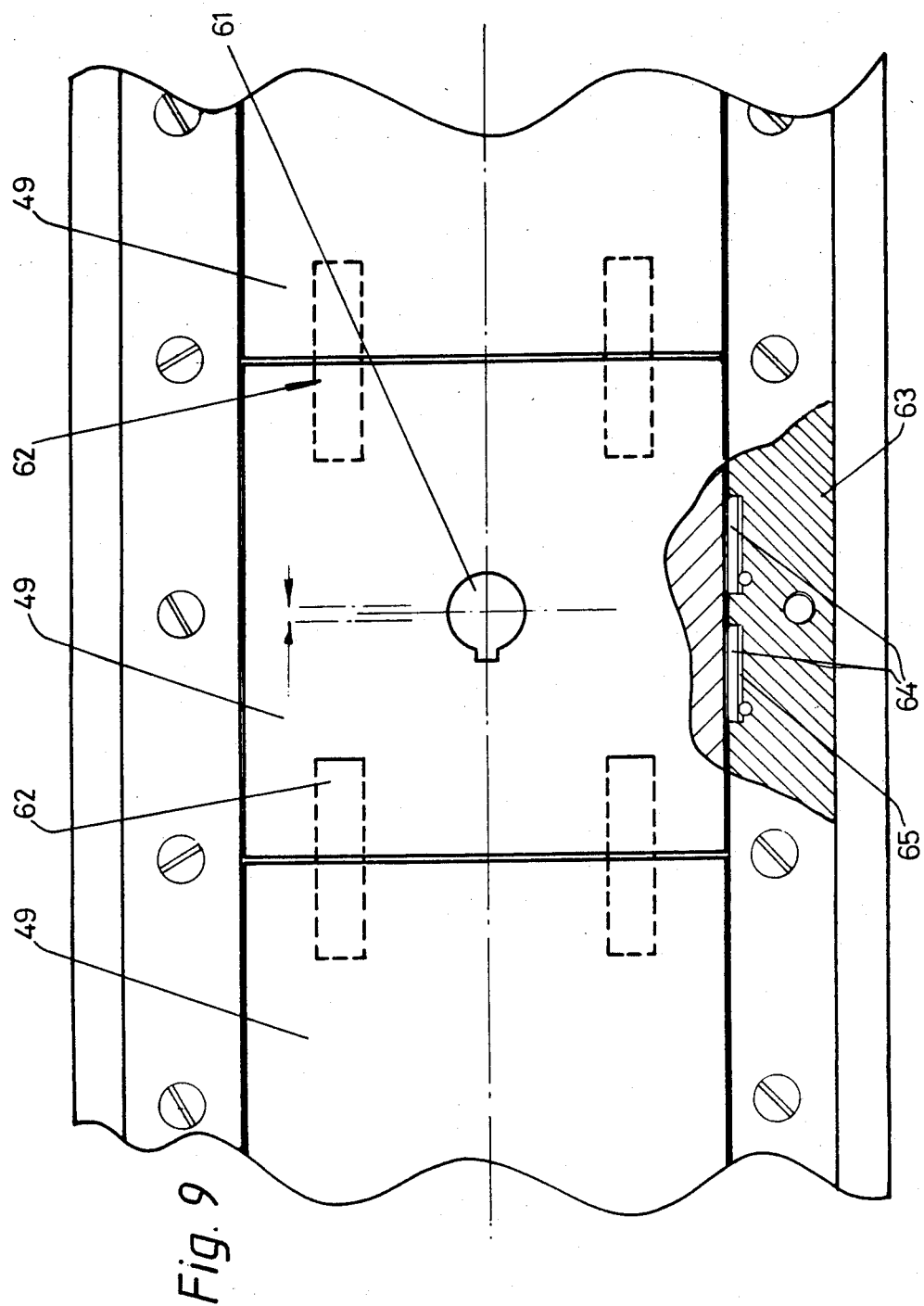
FIG. 9 is a plan view, partly in section, of part of a progression tooling machine.

FIG. 9 shows tool sections 49 positioned within channel walls 63. The tool sections are held in position by controllable clamping means comprising deformable metal discs 64 closing chambers 65 in the channel walls. Since very small clearances are present, and a small degree of movement of the discs 64 will effect clamping; this is achieved by pressurised hydraulic medium supplied to the chambers 65. Preferably the discs 64 in their free state are slightly concave, and thus under a preload pressure become flat for an unclamped condition.

Other controllable clamping means may be used, such as "Hollowrams" by Spencer Franklin.

The hydraulic circuit is formed so far as possible without elastically deformable components, to allow the chambers 65 to be pulsed with very high pressures, giving rapid clamping and release. The pressure pulses are suitably derived from a device driven by a cam or linkage from the press crank or slide, such that release occurs on the press upstroke.

This operation permits fine adjustment of the positioning of tool sections 49 to be made during operation, to compensate for changes in environmental conditions, the condition of incoming strip, or wear in the tools. As seen in FIG. 9, position adjustment may be made by pairs of adjusting devices 62 acting between adjacent tool sections 49.

Figure 10:
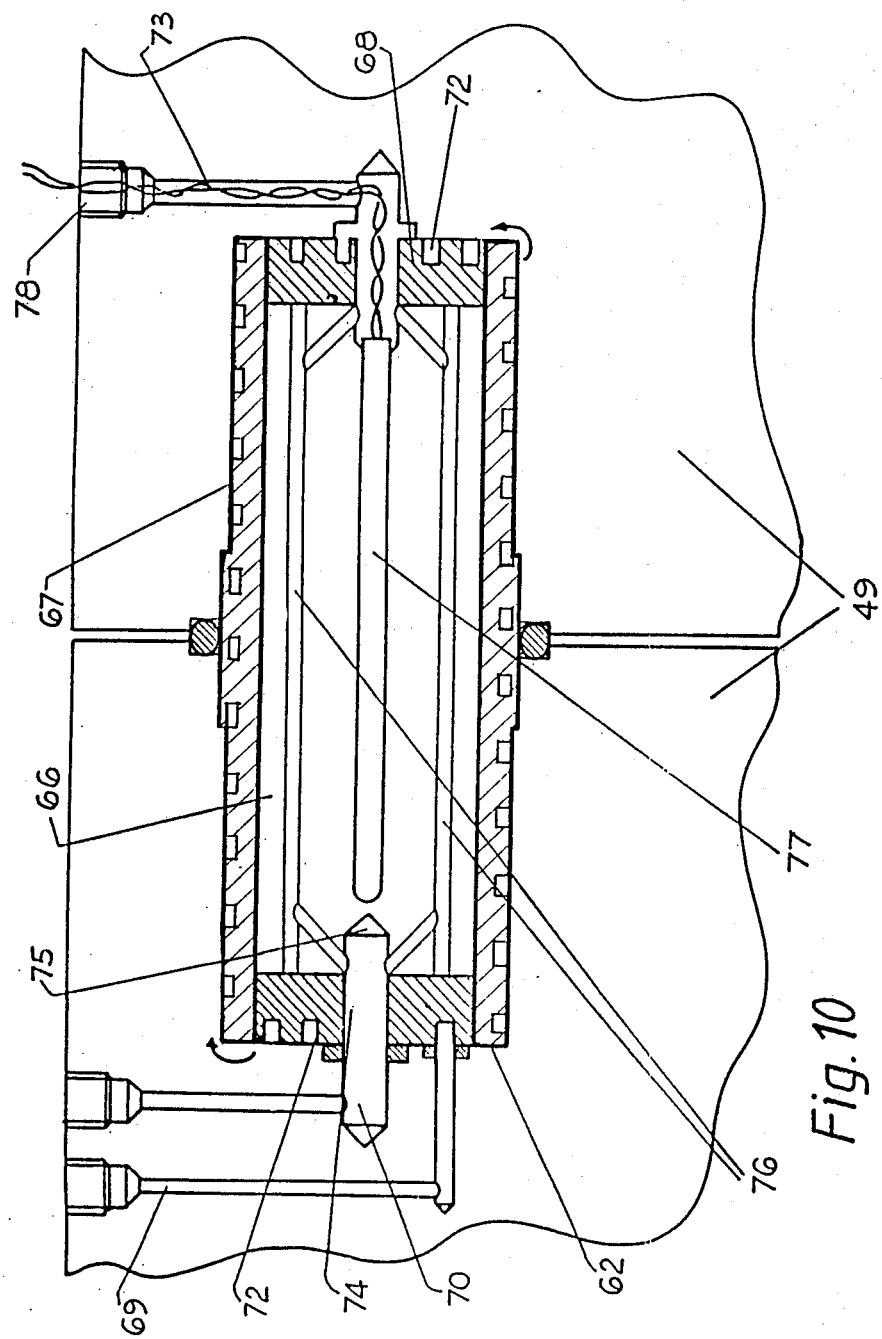
FIG. 10 is a cross-sectional side view showing part of the apparatus of FIG. 9 in detail, to an enlarged scale.

FIG. 10 shows on device 62 in detail. A precisely machined metal rod 66 of appropriate temperature coefficient, compressive strength and stiffness is enclosed in an insulating sleeve 67 and end caps 68 of insulating material such as ceramic. This enclosure minimises heat (from the operation to be described) leaking into the tool sections 49 and causing unpredictable changes. An external coolant path is provided via bore 69, spiral channels 72 in the end caps 68, and a helical channel 80 on the exterior of sleeve 67, to a drain 73. Suitable coolant for circulation in this path would be a fluid already provided in the press apparatus, such as die coolant or slug blowing air.

The device of FIG. 10 operates by heating or cooling the rod 66 to produce the desired dimensional change, taking account of its physical properties (including stiffness if working against a known load such as a spring or an opposing device 62).

Cooling may suitably be achieved by the above coolant controlled by a valve (not shown) routed through bore 70, a central aperture 74 in end cap 68, chamber 75, and an array of bores 76 to drain 73. If the device is of small diameter, a single central bore (i.e. an extension of chamber 75) could be used, but the arrangement shown is preferred since it results in a lower time constant. Heating is achieved by an electric resistance element 77, in the embodiment shown having a low voltage supply via drain port 78.

Temperature and length may be calculated, suitably by a microprocessor or the like, using the heating element resistance as a measure of temperature. Alternatively (not shown) a separate temperature sensor could be positioned within the rod 66.

As an alternative to electric heating, a circulating fluid could be used for both heating and cooling by use of a controllable external heat source.

As stated above, devices such as 62 may be used for other fine adjustment purposes, for example in the slitting apparatus of FIG. 1.

It will be appreciated that the devices 62 are used to adjust the tool sections to maintain the components produced within given tolerances. This is suitably controlled in a feedback manner by sensors measuring the parameters of interest in components downstream, the positioning being adjusted accordingly. Suitable feedback control arrangements will be apparent to those skilled in the art, and will not be described in detail.

Figure 11:
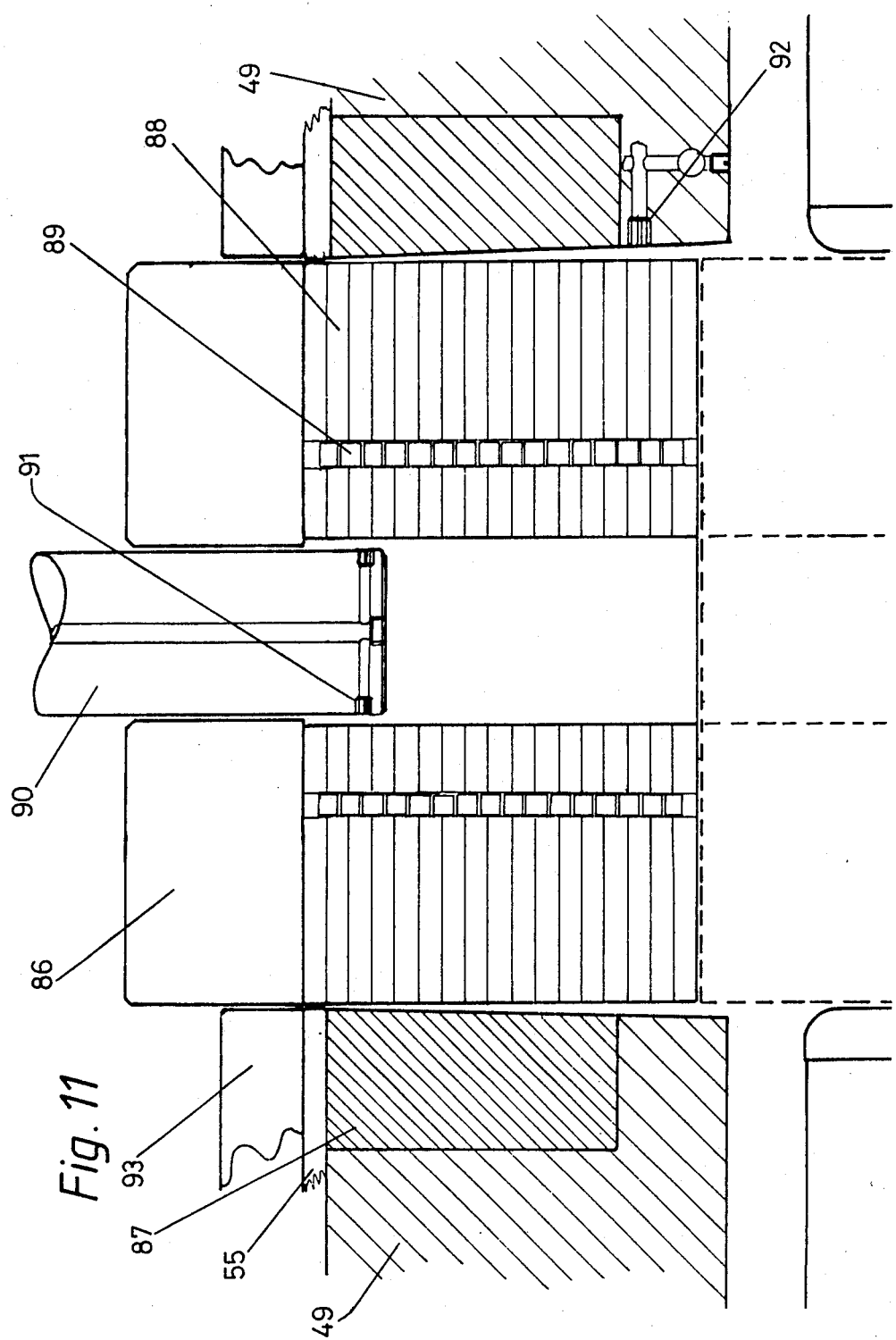
FIG. 11 is a cross-sectional side view of part of a progression tooling press showing sensors for feedback control of differential heating means upstream of the press.

FIG. 11 shows one particular form of sensing which is useful in providing feedback information. In this embodiment laminations 88 are produced which are stacked, being located together by interlocking part-punched slugs 89. The stack of laminations 88 is formed by punching the strip 55 through a carbide die 87 by punch 86 acting through stripper plate 93, the central aperture and the slugs 89 having been formed at previous stages. The die 87 is held in backing section 49. At each stroke, or at intervals as required, a probe 90 enters the aligned bores. The probe 90 is provided with sensors 91 spaced therearound and/or is rotated in the aligned bores to measure the diameter and centrality of the bores. A further array of sensors 92 is provided lower down around the exterior of the components 88, conveniently below the carbide die 87. The sensors 91, 92 may be pneumatic or electric. The information from these sensors is fed back through suitable known means to control the positioning of the shaft hole die section.

A simpler manual system would alternatively mark or flag laminations at intervals, store the correction parameters used for each, and permit an inspector to measure and then to enter the appropriate instructions for change.

Figure 12:
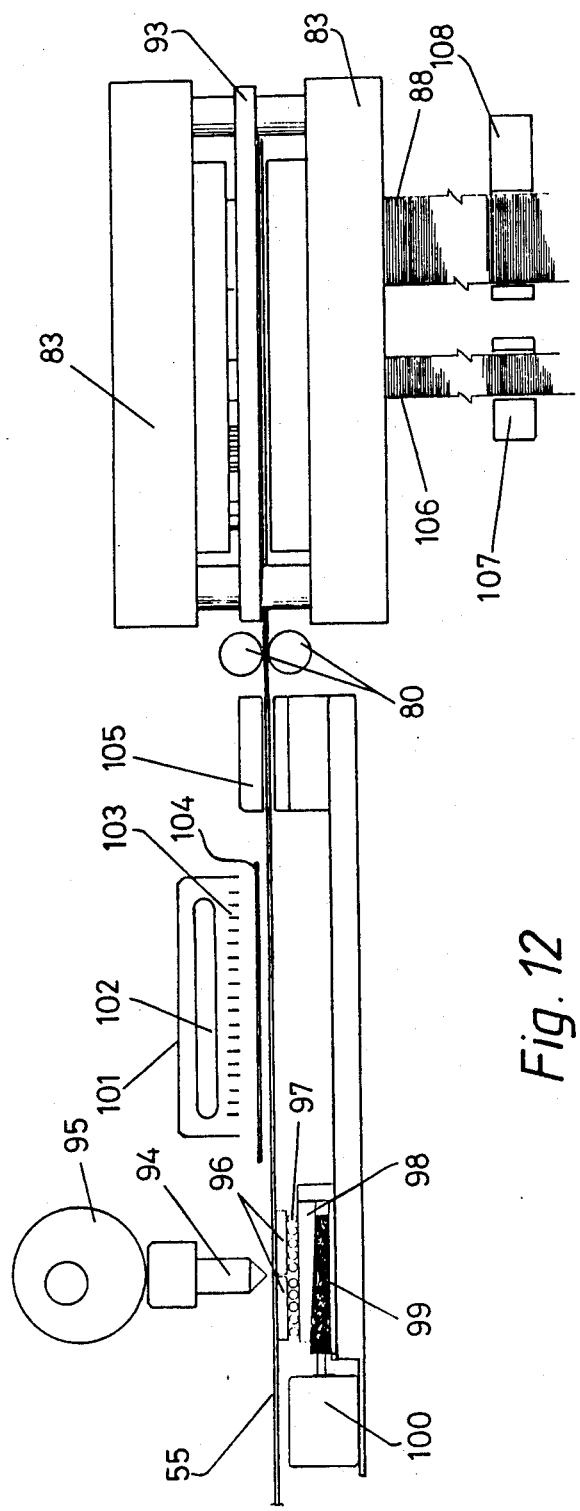
FIG. 12 is a schematic overall view of a progression tooling press line embodying the invention.

When punching circular work such as electric motor laminations there are difficulties in meeting required tolerances for diameter and ovality and in eliminating problems arising from edge bow (i.e. edge-to-edge curvature of the strip). FIG. 12 illustrates ways of dealing with these problems.

The scroll cut strip 55 is preferably pre-cooled to a given temperature, suitably in straightening rolls (not shown), and then passes through a pressing tool which can elongate the strip by indenting one or both surfaces at the position between adjacent components.

Figure 12A:
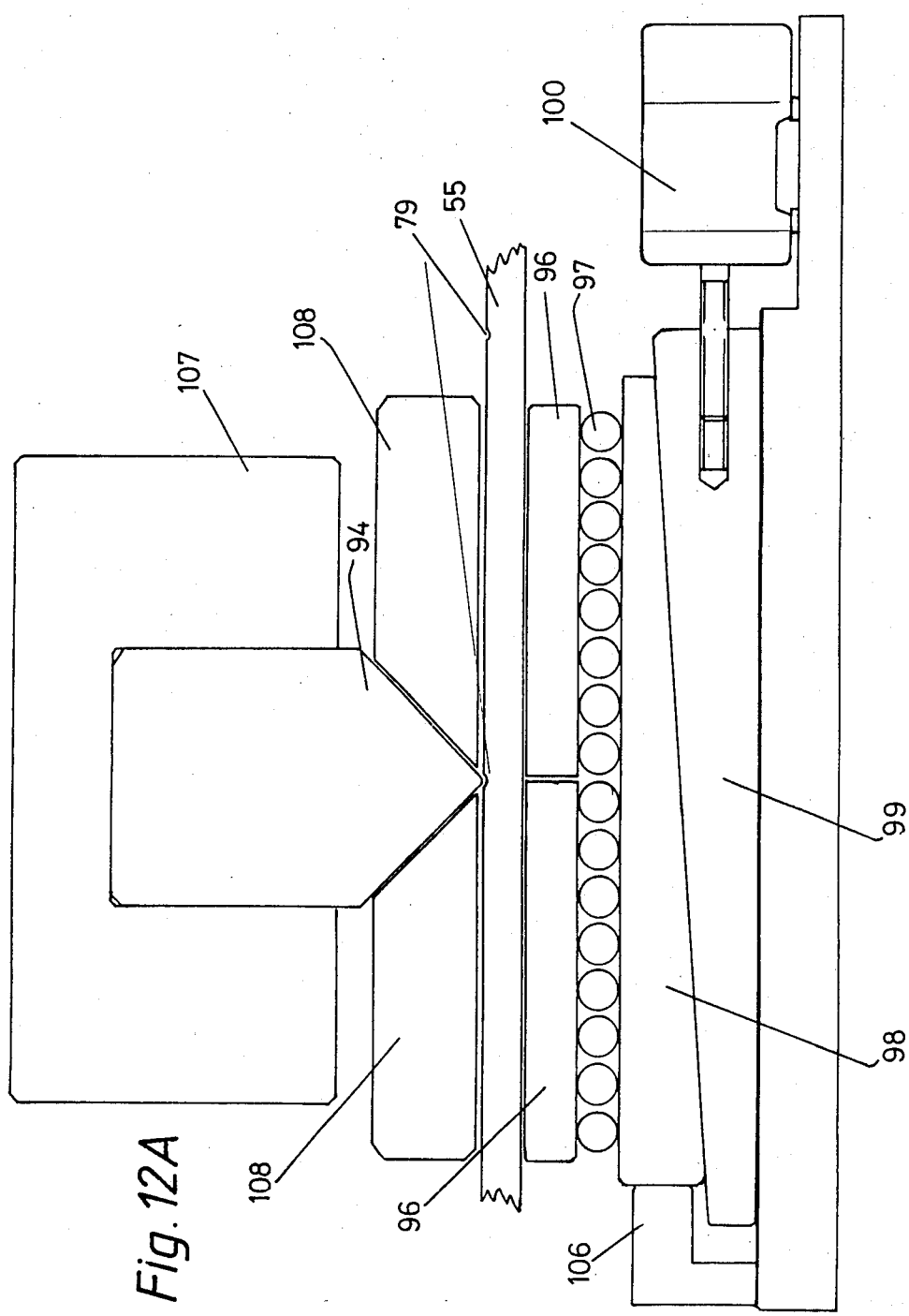
FIG. 12A is a more detailed view of indenting means used in FIG. 12.

The pressing tool shown (see also FIG. 12A) comprises a sharpened hard strip 94 held in a backing 107 and driven by an eccentric 95 into the strip 55 to form indents 79. Two such strips may be used, one on each side, but in this case the rear side friction which might prevent the strip elongating is relieved by backing plates 96 movable on needle rollers 97. Downward force around the separation zone is increased by cover plates 108 which move back against spring or like pressure, and help to ensure a minimum of stock material flow outside the surface thickness of the strip.

The depth of the indents 79 and hence the degree of elongation is controlled by backing wedges 98 and tapered backing plates 99. The top surfaces of the wedges 98 are suitably very slightly cylindrical, and conveniently there are two wedges across the width of the strip, thus allowing variable indentation across the width of the strip and hence correction of edge bow to be obtained. The position of the backing plates 99, and thus the degree of elongation, is controlled by servomotor (s) 100.

The strip 55 then passes (FIG. 12) through a heater section 101 fitted with high intensity short wave infrared quartz lamps 102 with a shutter mechanism 103, 104, a measuring means 105, and feed rolls 80 to the progression tooling press 83. In the example shown, the press 83 is producing rotor laminations 106 and stator laminations 88 (cf FIG. 11).

Figure 12B:
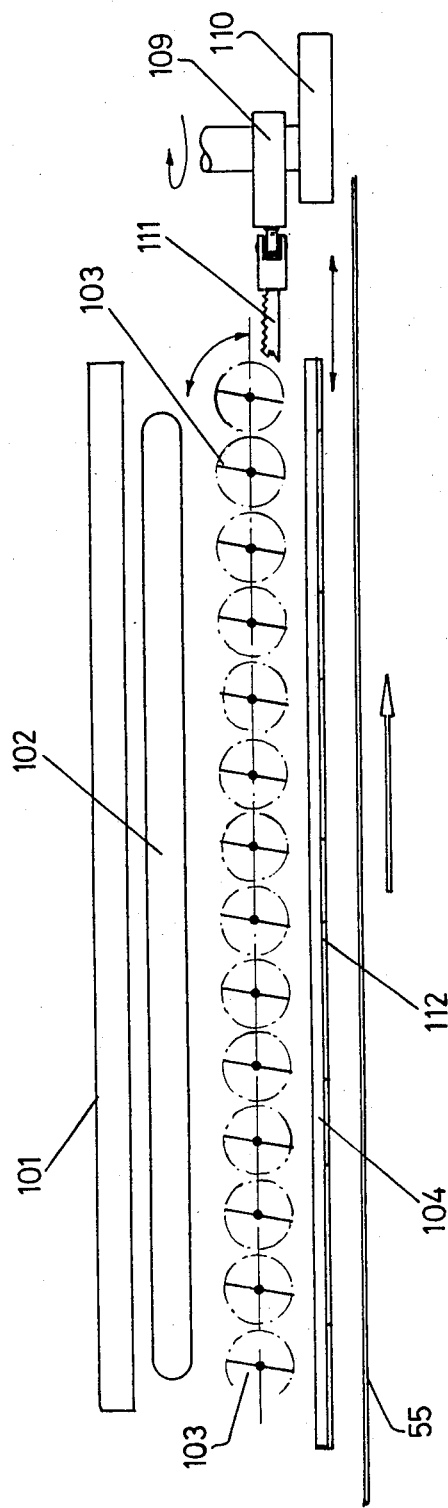
FIG. 12B is a more detailed view of differential heating means used in FIG. 12.

The heater section 101 is shown in greater detail in FIG. 12B. Correction of diameter is achieved by energisation of the lamps 102 to give a suitable temperature differential between the strip 55 and the press 83. For correction of ovality, it is necessary to produce heating differentially across the component position. The shutter mechanism 103, 104 is provided for this purpose.

The shutter mechanism comprises rotatable slats 103 which are opened and shut via a toothed rack 111 by cam 109 on a shaft synchronised with the press crank position and also a masking plate 104 provided with apertures 112, the masking plate 104 being reciprocated by a cam 110 on the same shaft. The arrangement is such that during forward feed of the strip 55 the slats 103 are open and the masking plate 104 moves in synchronism with the strip 55 to effect differential heating of parts of component areas, while during standstill of the strip the slats 103 are closed and the masking plate 104 is returned to its start position. Referring to FIG.

12C, the solid line 113 represents a typical velocity against time curve of the strip 55, while the broken line 114 represents the velocity against time of the masking plate 104.

As an alternative (not shown) the feed rolls 80 may have sufficient power to drive a light alloy masking plate via the strip itself. A releasable clamping mechanism and return spring would be used to synchronize the mask with the strip.

Figure 13:
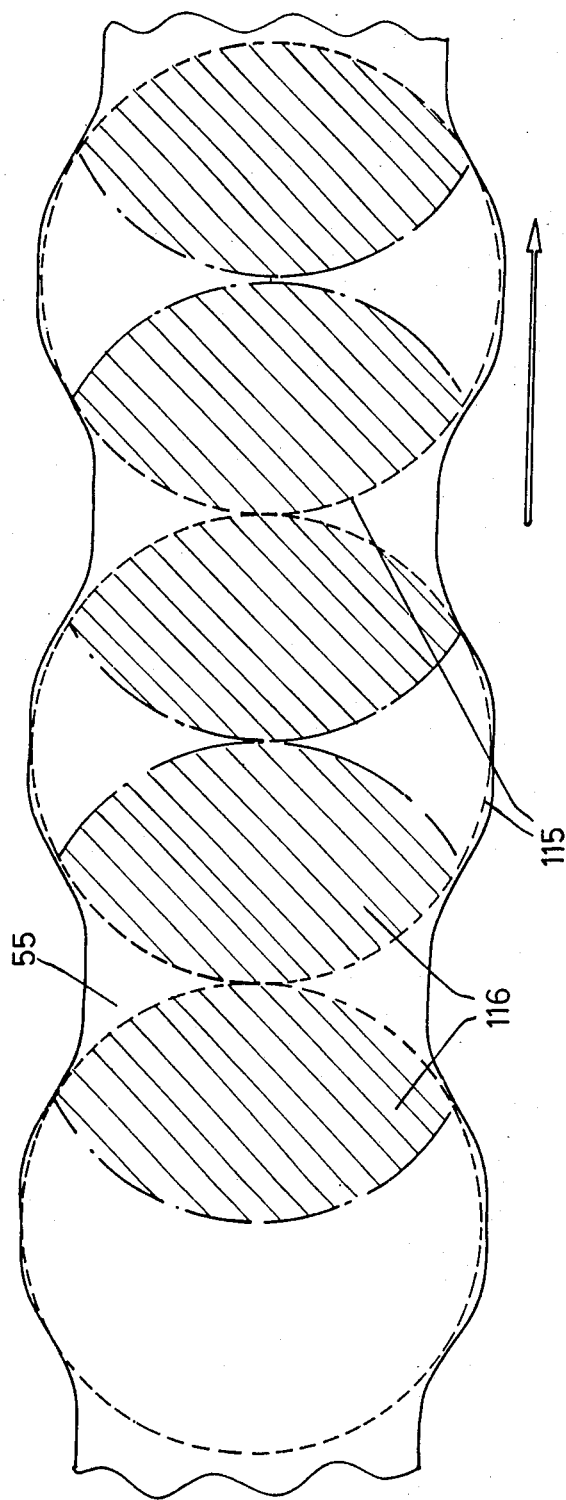
FIG. 13 is a plan view illustrating the heating effects of the heating means of FIG. 12B.

FIG. 13 illustrates a scroll-cut strip 55 to be used in forming circular components within the outer profile indicated at 115. The masking plate apertures 112 in this instance are circular to produce controlled heating of the shaded areas 116 which will thereby expand to correct for ovality in the longitudinal direction (which is the most common owing to the grain orientation of the rolled steel strip). The degree of heating is controlled by feedback control of the lamps 102 similar to that described with reference to FIG. 11. It is also within the scope of the invention to correct for other axes of ovality, for example by using rotatable masks, or by using two sets of masking apertures and a shuttle system. A further possibility is the use of an array of small heat sources capable of rapid switching and programmed to illuminate desired areas of the strip as it advances stepwise, in the manner of an illuminated moving sign.

Figure 14:
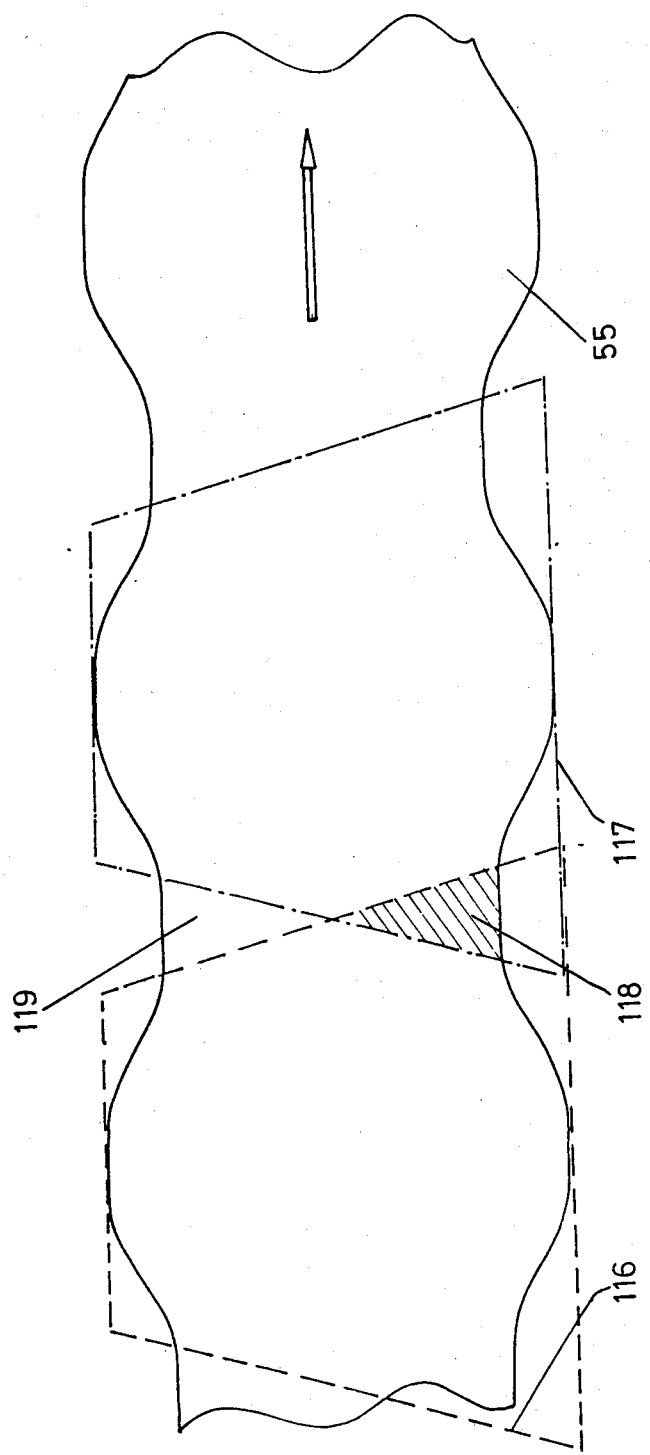
FIG. 14 is a plan view illustrating another differential heating system.

FIG. 14 illustrates an arrangement for correcting edge bow only. Illuminated heating areas 116 and 117 have their shapes controlled by simple movable shutters. During each stop in the feed cycle, area 118 receives double illumination and area 119 nil. These areas are scrap in the final punching and the high differential heating does not affect the components.

Means other than infrared lamps may be used to achieve the various forms of controlled differential heating discussed above, for example induction heating or steam jets.

Figure 15:
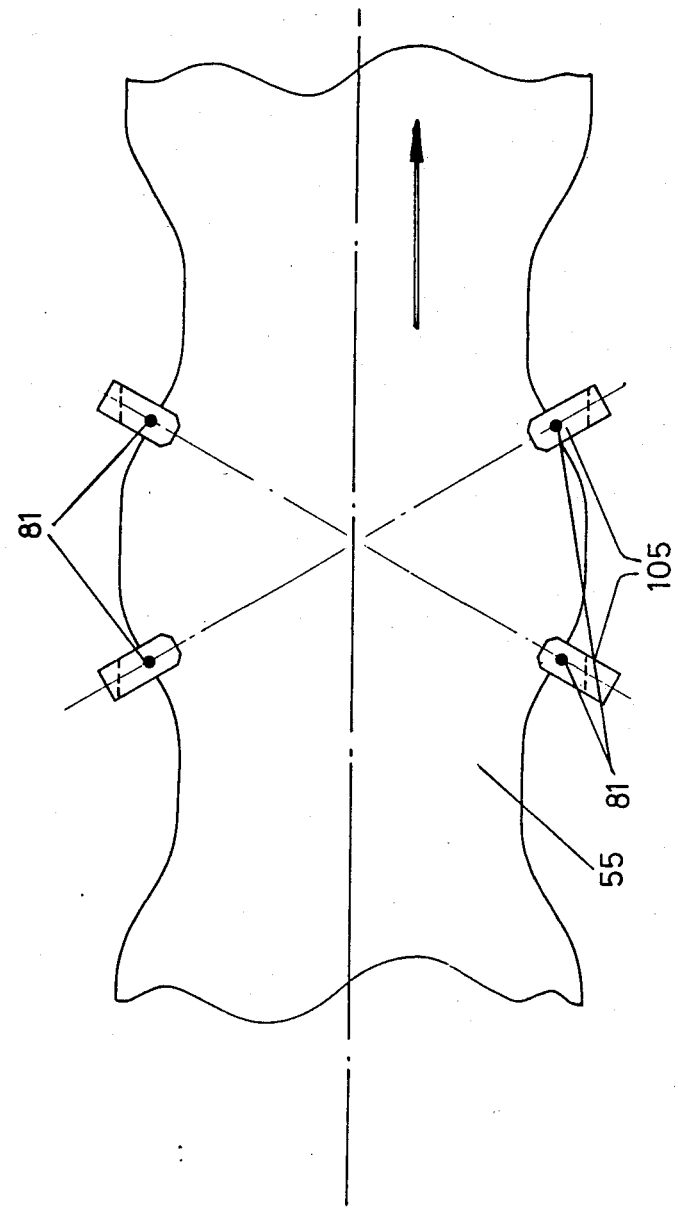
FIG. 15 is a plan view illustrating one form of measuring means for use in the apparatus of FIG. 12.

FIG. 15 shows one particularly suitable embodiment of measuring means 105 (FIG. 12) for use with scroll cut strip. This uses four sensors 81 arranged in diametrically opposed pairs to detect passage of the strip edge. The output signals can be compared differentially to allow for side movement of the strip stock in the stock guide, but at the same time detecting any skew which would indicate edge bow or cross feed. The sensors 81 may be magnetic, proximity or infrared sensors; these sensors are capable of reading strip position to very high accuracy, usually at press bottom dead centre, and at the high frequency required by conventional press stroke rates.

What I claim is:

1. Apparatus for processing a continuous metal strip to perform repetitive cutting operations upon said continuous metal strip, comprising: means for directing said continuous metal strip past a work station, means disposed at said work station for repetitively performing said cutting operations on said continuous metal strip as it is moved past said work station, measuring means disposed in advance of said work station for monitoring at least one parameter affecting the positional and dimensional accuracy with which said repetitive cutting operations are effected upon said continuous metal strip, and heating means disposed intermediate said measuring means and said work station and responsive to said measuring means for applying heat selectively to areas across the width of said continuous metal strip to control thereby with a high degree of precision the positions and dimensions of said cutting operations effected on said continuous metal strip by compensating for positional and dimensional variations arising from variations in said at least one parameter.

2. The apparatus of claim 1, wherein said heating means comprises an array of fast-response lamps positioned across the width of said metal strip and separately switchable.

3. The apparatus of claim 2, wherein said metal strip is moved in a given strip direction and is machined to have a profiled edge region, said heating means includes for each of said profiled edge regions a further group of lamps aligned with said given strip direction and sequentially switchable to provide a heating zone moving with said metal strip.

4. The apparatus of claim 1, wherein said heating means includes a heat source, a mask defining said chosen areas, means for moving said mask forward in synchronism with the strip movement and backward in a fly-back manner during each of said operations, and shutter means arranged to be open during said forward movement and closed during said backward movement.

5. The apparatus of claim 1, wherein said machining of said metal strip is effected by at least one energy beam, and there is further included a liquid coolant bath into which said strip metal passes in proximity to said repetitive cutting operations.

6. The apparatus of claim 5, further including a plurality of guide rolls, each having a partial conical shape arranged to separate said slit strips, each of said slit strips having opposing edges, and knife blades associated with said plurality of guide rolls, said knife blades disposed to bear on said slit edges with said guide rolls acting as backing rolls to remove extraneous metal resulting from said cutting operations.

7. The apparatus of claim 1, in which said one parameter monitored by said measuring means is tension of said metal strip.

8. The apparatus of claim 1, in which said one parameter monitored by said measuring means is temperature.

9. The apparatus of claim 1, in which said one parameter monitored by said measuring means is velocity.

10. The apparatus of claim 1, in which said measuring means comprises an array of sensors positioned to monitor variations in said at least one parameter across the width of said metal strip.

11. The apparatus of claim 1, in which said measuring means includes a plurality of position sensors located adjacent at least one edge of said metal strip.

12. In apparatus for processing a metal strip to produce repetitive operations by slitting said metal strip, the improvement comprising measuring means for monitoring at least one parameter effecting the accuracy with which said repetitive operations are produced at a plurality of locations of said metal strip, heating means responsive to said measuring means for applying heat selectively to chosen areas of said metal strip to compensate for variations in said at least one parameter, at least one pair of cutting means for slitting said metal strip, and a device interposed between said pair of cutting means for effecting mutual displacement of said pair of cutting means in accordance with the degree of heating applied to said metal strip by said heating means in advance of said slitting.

13. The apparatus of claim 12, wherein there is further included means for positioning said device under compression between said pair of cutting means, said device comprising a rigid mechanical member, and means for heating said rigid mechanical member for effecting mutual displacement in accordance with the degree of said strip heating.

* * * * *